(12) United States Patent
Noma et al.

(10) Patent No.: US 10,158,293 B2
(45) Date of Patent: Dec. 18, 2018

(54) POWER SUPPLY MODULE AND MOUNTING STRUCTURE THEREFOR

(71) Applicant: Murata Manufacturing Co., Ltd., Nagaokakyo-shi, Kyoto-fu (JP)

(72) Inventors: Takashi Noma, Nagaokakyo (JP); Keiichi Ichikawa, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 1 day.

(21) Appl. No.: 15/487,456

(22) Filed: Apr. 14, 2017

(65) Prior Publication Data
US 2017/0222563 A1 Aug. 3, 2017

Related U.S. Application Data

(63) Continuation of application No. PCT/JP2015/080477, filed on Oct. 29, 2015.

(30) Foreign Application Priority Data

Nov. 12, 2014 (JP) ................. 2014-230249

(51) Int. Cl.
*H02M 3/335* (2006.01)
*H01F 27/24* (2006.01)
(Continued)

(52) U.S. Cl.
CPC ........ *H02M 3/33507* (2013.01); *H01F 27/24* (2013.01); *H01F 27/2804* (2013.01);
(Continued)

(58) Field of Classification Search
CPC .. H02M 3/156; H02M 3/1588; H02M 3/1584; H02M 3/158; H02M 3/157;
(Continued)

(56) References Cited

U.S. PATENT DOCUMENTS 5,801,521 A * 9/1998 Mizoguchi .......... H01F 17/0006
29/602.1
6,144,269 A * 11/2000 Okamoto ................ H02M 1/12
333/184

(Continued)

FOREIGN PATENT DOCUMENTS

JP 59-084864 U 6/1984
JP 62-139395 A 6/1987
(Continued)

OTHER PUBLICATIONS

Official Communication issued in International Patent Application No. PCT/JP2015/080477, dated Jan. 26, 2016.

*Primary Examiner* — Jue Zhang
*Assistant Examiner* — Kevin H Sprenger
(74) *Attorney, Agent, or Firm* — Keating & Bennett, LLP

(57) ABSTRACT

A power supply module includes a substrate, a switching control IC and a coil. The coil includes a plurality of metal posts, first ends of which are mounted on a first surface of the substrate, wiring conductors that are in conductive contact with the first ends of the metal posts, and post connection conductors that are in conductive contact with second ends of the metal posts. The power supply module further includes a magnetic core that strengthens magnetic flux generated by the coil, and a sealing resin that seals the metal posts and the magnetic core.

18 Claims, 13 Drawing Sheets

(51) Int. Cl.
*H01F 27/28* (2006.01)
*H01F 27/29* (2006.01)
*H01F 27/32* (2006.01)
*H01F 38/42* (2006.01)
*H01F 27/40* (2006.01)
*H02M 3/155* (2006.01)

(52) U.S. Cl.
CPC ..... *H01F 27/2823* (2013.01); *H01F 27/2895* (2013.01); *H01F 27/292* (2013.01); *H01F 27/324* (2013.01); *H01F 27/40* (2013.01); *H01F 38/42* (2013.01); *H01F 2027/2809* (2013.01); *H02M 3/155* (2013.01); *H02M 3/335* (2013.01)

(58) Field of Classification Search
CPC ........... H02M 3/33507; H02M 3/1563; H02M 3/155; H02M 3/338; H02M 3/3385; H02M 3/3381; H02M 3/33523; H02M 3/33569; H02M 3/335; H02M 3/33538; H02M 3/33515; H02M 3/33592; H02M 3/33576; H02M 3/33561; H02M 3/07; H02M 3/073; H02M 3/135; H02M 3/137; H02M 7/103; H02M 7/106; H02M 7/10; H02M 7/7575; H02M 7/06; H02M 7/068; H02M 7/217; H02M 7/219; H02M 7/537; H02M 7/003; H02M 7/5387; H02M 7/538; H02M 7/53871; H02M 1/32; H02M 1/4258; H02M 1/4208; H02M 2001/0032; H02M 2001/0012; H02M 2001/0009; H02M 2001/0025; G05F 1/12; G05F 1/325; G05F 1/32; G05F 1/33; G05F 1/34; G05F 1/14; G05F 1/147; G05F 1/247; G05F 1/153; G05F 1/42; G05F 1/52; Y02B 70/1466; Y02B 70/1475; Y02B 70/126; Y02B 70/16; Y02B 70/1441; H01F 27/2847; H01F 2027/2857; H01F 38/085; H01F 2029/143; H01F 29/14; H01F 29/02; H01F 29/04; H03F 9/04; H03F 9/02
USPC ............. 363/18–21.01, 21.12–21.18, 59–61, 363/123–127, 131–132; 323/247, 323/249–257, 282–288
See application file for complete search history.

(56) References Cited

U.S. PATENT DOCUMENTS

| | | | | |
|---|---|---|---|---|
| 6,940,189 | B2* | 9/2005 | Gizara | H02M 3/00 257/E25.029 |
| 7,298,238 | B1* | 11/2007 | Eaton | H01F 21/12 323/255 |
| 7,304,558 | B1 | 12/2007 | Pleskach et al. | |
| 7,821,374 | B2* | 10/2010 | Harrison | H01F 19/04 336/192 |
| 9,960,697 | B2* | 5/2018 | Nakajima | H02M 3/33569 |
| 2004/0140877 | A1* | 7/2004 | Nakao | H01F 19/08 336/200 |
| 2004/0145929 | A1* | 7/2004 | Mihara | H02M 1/425 363/98 |
| 2005/0052268 | A1 | 3/2005 | Pleskach et al. | |
| 2005/0068792 | A1* | 3/2005 | Yasumura | H01F 30/04 363/21.06 |
| 2006/0176139 | A1 | 8/2006 | Pleskach et al. | |
| 2007/0152651 | A1 | 7/2007 | Shiokawa et al. | |
| 2009/0201005 | A1 | 8/2009 | Noma et al. | |
| 2016/0359419 | A1* | 12/2016 | Lin | H02M 1/08 |

FOREIGN PATENT DOCUMENTS

| | | |
|---|---|---|
| JP | 62-176111 A | 8/1987 |
| JP | 62-190825 A | 8/1987 |
| JP | 05-090036 A | 4/1993 |
| JP | 10-214724 A | 8/1998 |
| JP | 2000-040620 A | 2/2000 |
| JP | 2003-086690 A | 3/2003 |
| JP | 2004-193319 A | 7/2004 |
| JP | 2006-165212 A | 6/2006 |
| JP | 2007-057494 A | 3/2007 |
| JP | 2007-504665 A | 3/2007 |
| JP | 2007-095846 A | 4/2007 |
| JP | 2007-150022 A | 6/2007 |
| JP | 2007-155427 A | 6/2007 |
| JP | 2007-225406 A | 9/2007 |
| JP | 2008-177574 A | 7/2008 |
| JP | 2008-530799 A | 8/2008 |
| JP | 2009-085620 A | 4/2009 |
| JP | 2009-212265 A | 9/2009 |
| JP | 2010-232392 A | 10/2010 |
| JP | 2013-207149 A | 10/2013 |
| JP | 2014-127512 A | 7/2014 |
| WO | 2008/087781 A1 | 7/2008 |
| WO | 2013/038752 A1 | 3/2013 |

* cited by examiner

POWER SUPPLY MODULE AND MOUNTING STRUCTURE THEREFOR

CROSS REFERENCE TO RELATED APPLICATIONS

This application claims the benefit of priority to Japanese Patent Application No. 2014-230249 filed on Nov. 12, 2014 and is a Continuation application of PCT Application No. PCT/JP2015/080477 filed on Oct. 29, 2015. The entire contents of each application are hereby incorporated herein by reference.

BACKGROUND OF THE INVENTION

1. Field of the Invention

The present invention relates to a power supply module that includes a power supply circuit, such as a DC/DC converter, and to a mounting structure to mount the power supply module on a printed wiring board.

2. Description of the Related Art

A power supply module that is to be mounted as one component on a printed wiring board is typically required to be small and have high efficiency. For example, International Publication No. 2008/087781 discloses a power supply module that has been reduced in size by using a multilayer ferrite substrate.

In the power supply module disclosed in International Publication No. 2008/087781, a coil is formed by thick film printing inside the multilayer ferrite substrate and a chip component, such as a switching control IC, is mounted on an upper surface of the multilayer substrate.

It is difficult to make the direct-current resistance (Rdc) of a coil small when the coil is formed using thick film printing as disclosed in International Publication No. 2008/087781. Increasing the line width and the film thickness of coil conductors is an effective way of reducing the direct-current resistance, but there is a limit to the extent to which this can be done while reducing the size of the power supply module.

Furthermore, since wiring is formed of Ag inside a ferrite ceramic and then fired so as to become integrated with the ferrite ceramic, there is residual mechanical strain resulting from the different thermal expansion coefficients when the temperature falls after firing. Consequently, it is technically difficult to suppress the generation of cracks and other defects that reduce reliability.

In addition, when a multilayer substrate formed of a ferrite ceramic is thin, the multilayer substrate is more likely to break, and therefore, it is difficult to reduce the thickness of a multilayer substrate.

SUMMARY OF THE INVENTION

Preferred embodiments of the present invention provide a power supply module that is small, has high efficiency, and has high reliability, and provide a mounting structure for the power supply module.

A power supply module according to a preferred embodiment of the present invention includes a substrate, a switching control IC, and a coil.

The coil includes a plurality of metal posts that each include a first end and a second end, the first ends being provided on a first surface of the substrate, a wiring conductor that is provided on the substrate and that is in conductive contact with the first ends of the metal posts, and a post connection conductor that is in conductive contact with the second ends of the metal posts.

The power supply module further includes a magnetic core that strengthens magnetic flux generated by the coil, and a sealing resin that is provided on a first main surface of the substrate and seals the metal posts and the magnetic core.

With the above-described configuration, a coil having a low direct-current resistance is obtained by using metal posts that have a very low resistance as compared to coil conductors that are formed by thick film printing. In addition, the problem of the magnetic core and the substrate breaking is eliminated.

In a power supply module according to a preferred embodiment of the present invention, the coil preferably includes a primary coil and a secondary coil that is electrically insulated from the primary coil, and an insulating portion between the primary coil and the secondary coil is preferably sealed with the sealing resin. With this structure, the required insulating distance between the primary coil and the secondary coil is easily secured and a corresponding reduction in size is achieved.

In a power supply module according to a preferred embodiment of the present invention, the post connection conductor is preferably located inside the sealing resin. With this structure, a property of the coil being insulated with respect to an outer surface of the power supply module is effectively ensured.

In a power supply module according to a preferred embodiment of the present invention, at least a portion of the post connection conductor is preferably exposed from the sealing resin. With this structure, a heat-radiating property is provided for the coil.

In a power supply module according to a preferred embodiment of the present invention, the post connection conductor, which is exposed from the sealing resin, preferably defines a mounting electrode that is to be mounted on a printed wiring substrate, which is a mounting target. With this structure, since a surface conductor of the printed wiring board defines a portion of the coil conductor, the direct-current resistance of the coil is further reduced. In addition, since the surface conductor of the printed wiring board and the printed wiring board define and function as heat-radiating members for the coil, the power supply module is able to be further reduced in size.

In a power supply module according to a preferred embodiment of the present invention, a toroidal coil is preferably defined by the coil and the magnetic core. Thus, there is little leakage of magnetic flux, and leaking of the magnetic field to the outside is effectively reduced or prevented.

In a power supply module according to a preferred embodiment of the present invention, the plurality of metal posts are preferably provided outside and inside the magnetic core, and among the plurality of metal posts, there is preferably a larger number of metal posts located outside the magnetic core than inside the magnetic core. With this structure, the resistance value of the portion of the coil defined by the plurality of metal posts on the outside is reduced, and a coil having a smaller direct-current resistance is provided.

In a power supply module according to a preferred embodiment of the present invention, diameters of the metal posts located outside the magnetic core are preferably smaller than diameters of the metal posts located inside the magnetic core. With this structure, a reduction in the surface area of the coil is achieved.

In a power supply module according to a preferred embodiment of the present invention, a magnetic circuit gap is preferably provided in a portion of the magnetic core.

With this structure, a coil is provided that has a high magnetic saturation characteristic and a high direct-current superposition characteristic.

In a power supply module according to a preferred embodiment of the present invention, the substrate preferably includes a ground conductor between the switching control IC and the coil. With this structure, the switching control IC is unlikely to the affected by the electromagnetic field of the coil even when the size of the entire power supply module is reduced.

In a power supply module according to a preferred embodiment of the present invention, the substrate is preferably a multilayer body including a plurality of insulating layers that each include a conductor pattern, and the wiring conductor is preferably defined by conductor patterns provided on the plurality of insulating layers. With this structure, the resistance value of the conductor pattern is reduced and the direct-current resistance of the coil is further reduced.

A power supply module mounting structure according to a preferred embodiment of the present invention is a mounting structure to mount a power supply module on a printed wiring board, the power supply module including a substrate, a switching control IC and a coil.

The coil includes a plurality of metal posts that each include a first end and a second end, the first ends being arranged on a first surface of the substrate, a wiring conductor that is provided on the substrate and that is in conductive contact with the first ends of the metal posts, and a post connection conductor that is in conductive contact with the second ends of the metal posts.

The power supply module further includes a magnetic core that strengthens magnetic flux generated by the coil, and a sealing resin that is provided on a first main surface of the substrate and seals the metal posts and the magnetic core.

At least a portion of the post connection conductor is exposed from the sealing resin.

A surface conductor that corresponds to the exposed post connection conductor is provided on the printed wiring board.

The post connection conductor, which is exposed from the sealing resin, and the surface conductor of the printed wiring board are connected to each other with a conductive bonding material.

With the above-described structure, the surface conductor of the printed wiring board defines a portion of the coil conductor, and therefore, the direct-current resistance of the coil is further reduced and a high-efficiency power supply circuit is provided. In addition, since the surface conductor of the printed wiring board and the printed wiring board define and function as heat-radiating members for the coil, the mounting area of the power supply module is able to be further reduced in size.

According to various preferred embodiments of the present invention, a power supply module is provided that is small, has high efficiency, and has high reliability, and a mounting structure for the power supply module is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
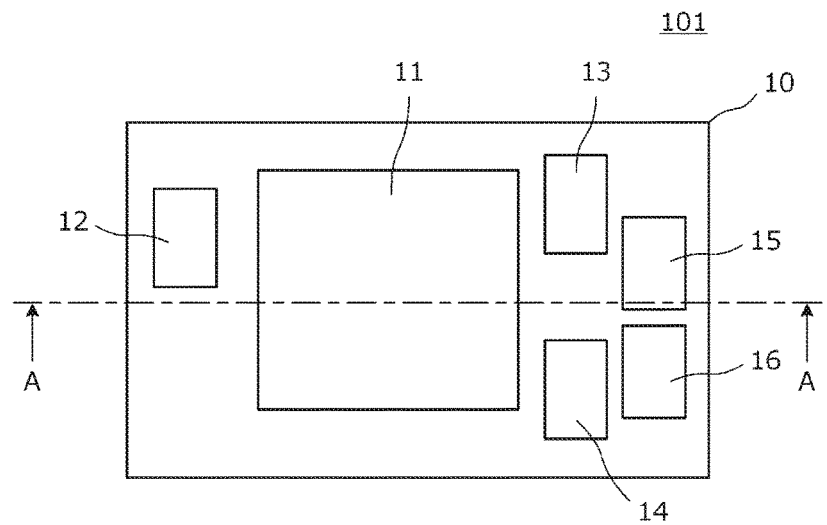
FIG. 1A is a plan view of a power supply module 101 according to a first preferred embodiment of the present invention.

Hereafter, preferred embodiments of the present invention will be described with reference to the drawings. Like symbols denote like portions in the drawings. In the second and subsequent preferred embodiments of the present invention, description of matters common to the first preferred embodiment will be omitted and only the differences will be described. In particular, the same operational effects resulting from the same configurations will not be repeatedly described in the individual preferred embodiments.

First Preferred Embodiment

Figure 1B:
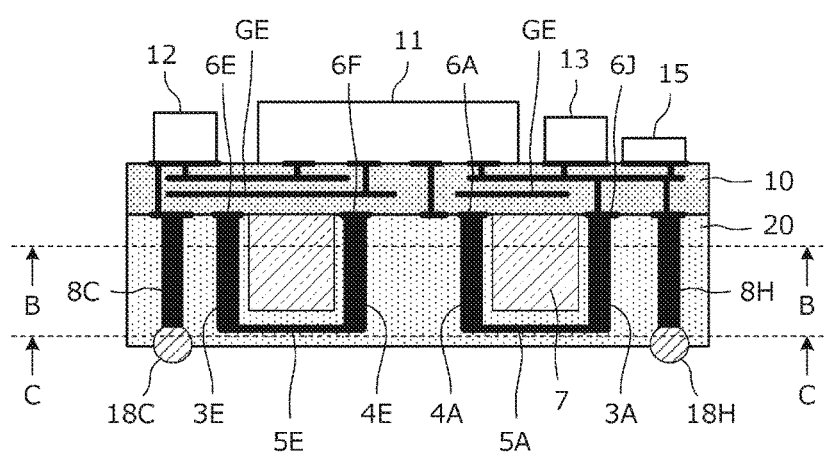
FIG. 1B is a vertical sectional view taken along A-A in FIG. 1A.
Figure 1C:
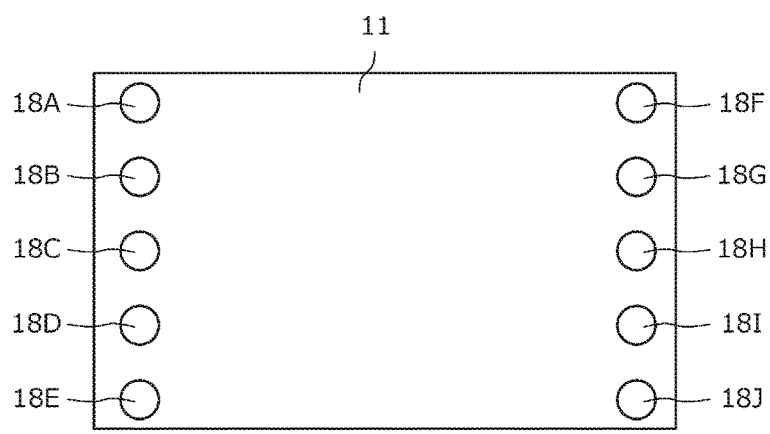
FIG. 1C is bottom view of the power supply module 101.
Figure 2A:
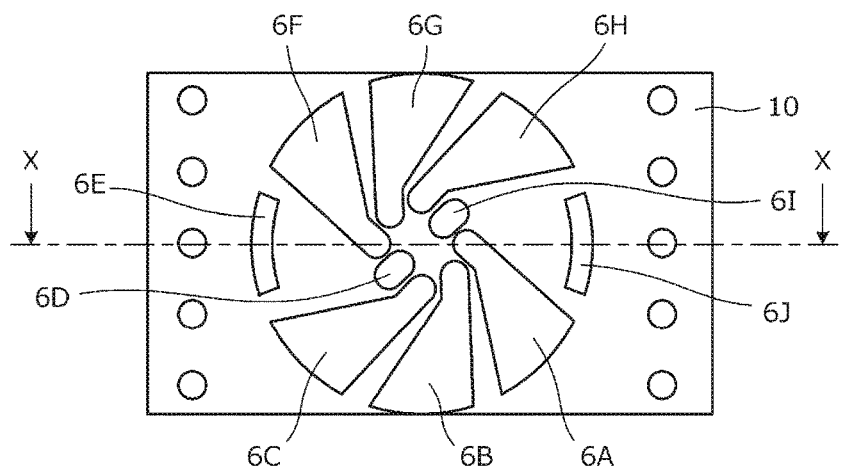
FIG. 2A is a bottom view of a substrate 10 of the power supply module 101.
Figure 2B:
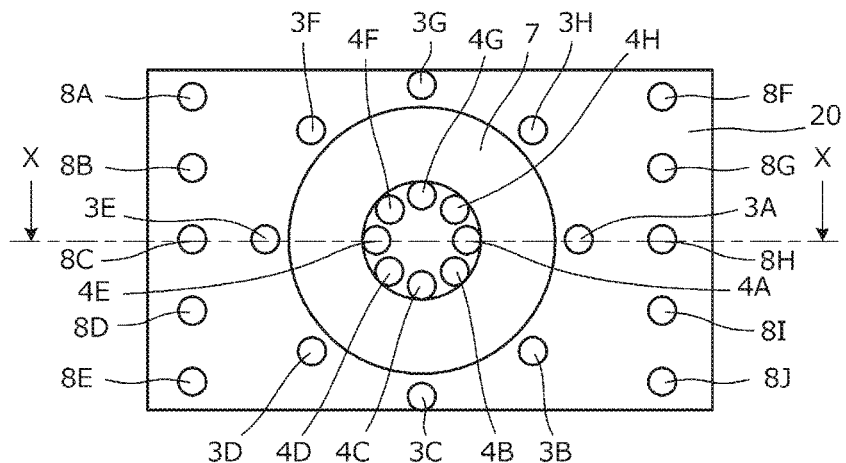
FIG. 2B is a horizontal sectional view taken along B-B in FIG. 1B.
Figure 2C:
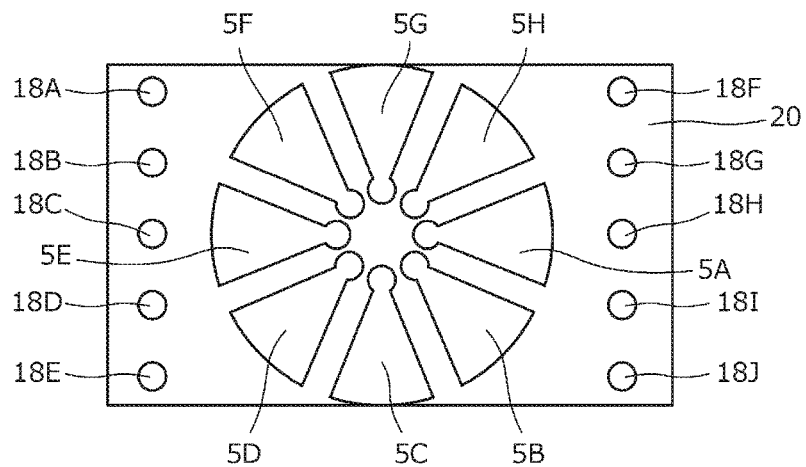
FIG. 2C is a horizontal sectional view taken along C-C in FIG. 1B.

FIG. 1A is a plan view of a power supply module 101 according to a first preferred embodiment of the present invention, FIG. 1B is a vertical sectional view taken along A-A in FIG. 1A, and FIG. 1C is bottom view of the power supply module 101. In addition, FIG. 2A is a bottom view of a substrate 10 of the power supply module 101. FIG. 2B is a horizontal sectional view taken along B-B in FIG. 1B, and FIG. 2C is a horizontal sectional view taken along C-C in FIG. 1B. Furthermore, FIG. 1B is a vertical sectional view taken along X-X in FIGS. 2A and 2B.

The power supply module 101 of this preferred embodiment includes the substrate 10. The substrate 10 is a resin multilayer substrate, and prescribed wiring patterns are provided on a first main surface (lower surface in orientation illustrated in FIG. 1) and a second main surface (upper surface in orientation illustrated in FIG. 1) of the substrate 10, and inside the substrate 10. A switching control IC 11 and chip components 12, 13, 14, 15 and 16 are mounted on the second main surface of the substrate 10.

A plurality of metal posts 3A to 3H, 4A to 4H and 8A to 8J, which each include a first end and a second end, are provided on the first main surface of the substrate 10. The first ends of the metal posts 3A to 3H, 4A to 4H and 8A to 8J are mounted on the lower surface of the substrate 10. The metal posts 3A to 3H, 4A to 4H and 8A to 8J are handled in the same or substantially the same manner as a normal surface mount device and are attached to lands provided on the first main surface of the substrate 10 using solder.

Among the metal posts, the metal posts 3A to 3H and 4A to 4H define portions of coils. The metal posts 8A to 8J enable a circuit provided in and on the substrate 10 to be led out a mounting surface. The metal posts 3A to 3H, 4A to 4H and 8A to 8J are preferably, for example, cylindrical metal pins made of a metal having high electrical conductivity, such as Cu. For example, the metal posts can be obtained by cutting Cu wires having a circular or substantially circular cross sectional shape into pieces of a prescribed unit length. Preferably, the diameter is about 0.5 mm to about 1.0 mm and the length is about 1.5 mm to about 3.0 mm, for example. The cross sectional shape of the metal posts does not necessarily have to be circular or substantially circular. The cross sectional shape may instead be semicircular or quadrangular, for example.

As illustrated in FIGS. 2A and 2B, wiring conductors 6A to 6C and 6F to 6H, which connect the first ends of the metal posts 3A to 3H and 4A to 4H to each other, and wiring conductors 6D, 6E, 6I and 6J, which define input terminals of the coil, are provided on the first main surface of the substrate 10. In addition, as illustrated in FIGS. 2B and 2C, the second ends of the metal posts 3A to 3H and 4A to 4H are connected to each other by post connection conductors 5A to 5H.

A primary coil of a transformer is defined by the metal posts 3A to 3D and 4A to 4D, the wiring conductors 6A to 6C, 6J and 6D and the post connection conductors 5A to 5D. In addition, a secondary coil of the transformer is defined by the metal posts 3E to 3H and 4E to 4H, the wiring conductors 6F to 6H, 6E and 6I and the post connection conductors 5E to 5H.

The power supply module 101 includes a magnetic core 7 that includes a toroidal magnetic ferrite. The primary coil and the secondary coil are wound around the magnetic core 7.

Sealing resin 20 is provided on the first main surface of the substrate 10. The sealing resin 20 seals the metal posts 3A to 3H, 4A to 4H and 8A to 8J and the magnetic core 7. The sealing resin 20 is preferably an epoxy resin, for example.

Solder bumps (balls) 18A to 18J are provided on the second ends of the metal posts 8A to 8J. The solder bumps 18A to 18J are exposed through the lower surface of the sealing resin 20.

The post connection conductors 5A to 5H are formed using the following non-limiting example of a method.

(1) The sealing resin 20 is applied with such a thickness as to cover the second ends of the metal posts 3A to 3H, 4A to 4H and 8A to 8J, and then cured.

(2) The surface of the sealing resin 20 is ground down until the second ends of the metal posts 3A to 3H, 4A to 4H and 8A to 8J are exposed.

(3) Conductive paste patterns, which are for forming the post connection conductors 5A to 5H, are formed by printing on the surface of the sealing resin 20 and allowed to harden.

(4) The post connection conductors 5A to 5H, which are made of a conductive paste, are subjected to Cu plating and the film thickness thereof is increased.

(5) Solder bumps are adhered to the second ends of the metal posts 8A to 8J.

(6) Sealing resin 20 of a prescribed thickness is applied once more to the surface of the sealing resin 20 and cured. Alternatively, a resin film composed of a solder resist is formed by printing.

The primary coil and the secondary coil define current paths as a result of the constituent portions thereof being connected in the following orders.

Primary Coil

Conductor 6J (refer to FIG. 2A)→metal post 3A (refer to FIG. 2B)→conductor 5A (refer to FIG. 2C)→metal post 4A→conductor 6A→metal post 3B→conductor 5B→metal post 4B→conductor 6B→metal post 3C→conductor 5C→metal post 4C→conductor 6C→metal post 3D→conductor 5D→metal post 4D→conductor 6D.

Secondary Coil

Conductor 6E→metal post 3E→conductor 5E→metal post 4E→conductor 6F→metal post 3F→conductor 5F→metal post 4F→conductor 6G→metal post 3G→conductor 5G→metal post 4G→conductor 6H→metal post 3H→conductor 5H→metal post 4H→conductor 6I.

In addition, a ground conductor GE, which preferably has a planar shape, for example, is provided inside the substrate 10. The ground conductor is located between the primary coil and the secondary coil, and the switching control IC 11.

Figure 3:
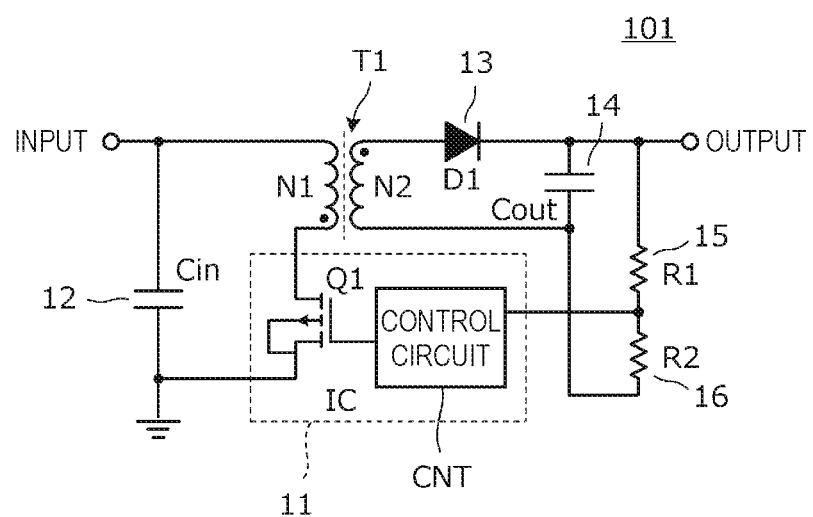
FIG. 3 is a circuit diagram of the power supply module 101 according to the first preferred embodiment of the present invention.

FIG. 3 is a circuit diagram of the power supply module 101 of this preferred embodiment. The power supply module 101 is preferably a flyback-type DC/DC converter, for example. The switching control IC 11 includes a switching element Q1 and a switching control circuit CNT. A series circuit includes a primary coil N1 of a transformer T1 (the primary coil N1 is defined by the metal posts 3A to 3D and 4A to 4D, the wiring conductors 6A to 6C, 6J and 6D and the post connection conductors 5A to 5D) and the switching element Q1 is connected between an input terminal and the ground. In addition, an input capacitor Cin (chip component 12) is connected between the input terminal and the ground. A rectifying-smoothing circuit that includes a diode D1 (chip component 13) and an output capacitor Cout (chip component 14) is provided for the secondary coil N2 of the transformer T1 (the secondary coil N2 is defined by the metal posts 3E to 3H and 4E to 4H, the wiring conductors 6F to 6H, 6E and 6I, and the post connection conductors 5E to 5H). The switching control circuit CNT is connected to the gate of the switching element Q1. A voltage-dividing circuit, which includes resistors R1 and R2 (chip components 15 and 16), is connected to the output terminal, and a divided voltage produced thereby is fed back to the control circuit CNT. The switching control circuit CNT controls an on period of the switching element Q1 such that the output voltage is constant.

The power supply module of this preferred embodiment is preferably used as an insulation-type stabilization power supply having a current capacity of around several amps, for example.

According to this preferred embodiment, the following advantages and effects are obtained.

(a) The resistance values of the metal posts are very low as compared to those of conductor patterns formed by thick film printing, and therefore, a coil having low direct-current resistance is obtained.

(b) A magnetic substrate is not used in the transformer portion, and therefore, the problem of the substrate breaking is avoided. Furthermore, the magnetic core is buried inside the sealing resin, and therefore, high shock resistance is obtained.

(c) The space between the primary coil and the secondary coil is sealed with the sealing resin 20, and therefore, the required insulation distance (insulation creeping distance) is readily ensured between the primary coil and the secondary coil, and a corresponding size reduction is achieved.

(d) The post connection conductors 5A to 5H are arranged inside the sealing resin 20, and as a result, a property of the coil being insulated with respect to an outer surface of the power supply module 101 is ensured.

(e) A toroidal coil is defined by the coils and the magnetic core 7, and therefore, there is little leakage of magnetic flux and leaking of the magnetic field to the outside is effectively reduced or prevented.

(f) The ground conductor GE is interposed between the switching control IC 11 and the coils (transformer), and therefore, the switching control IC 11 is unlikely to be affected by the electromagnetic field of the coils (transformer) even when the entire device is reduced in size.

(g) Compared to a case in which a hand-wound coil is mounted, the stray capacitance generated by the coil can be made constant or substantially constant, and therefore, the manners in which noise generated by the coil and noise generated by the path of the coil current are generated are able to be predicted and easily controlled.

Second Preferred Embodiment

Figure 4A:
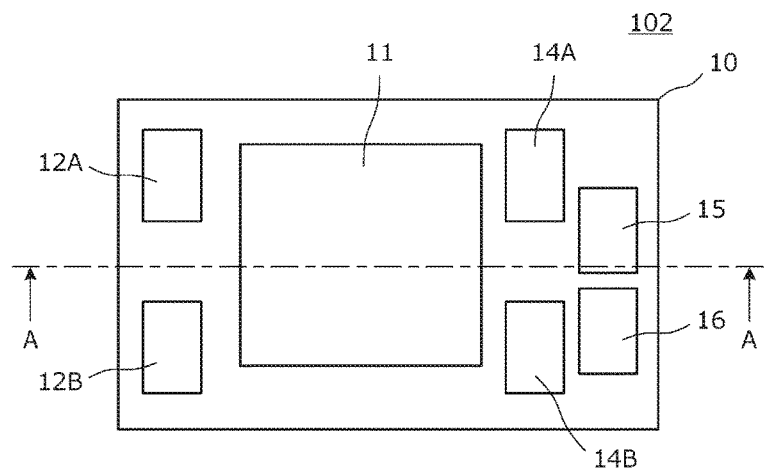
FIG. 4A is a plan view of a power supply module 102 according to a second preferred embodiment of the present invention.
Figure 4B:
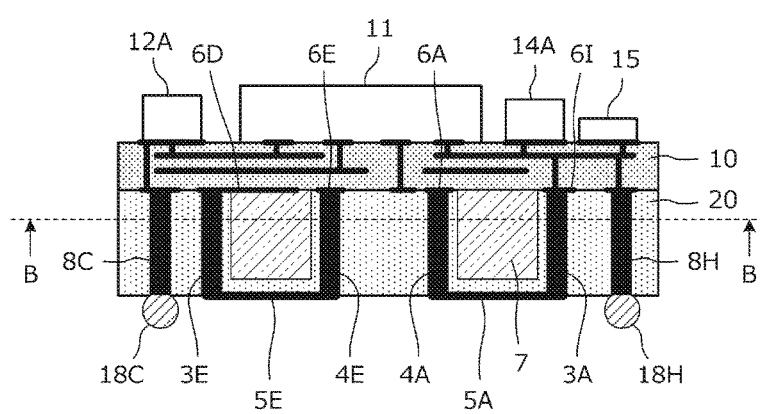
FIG. 4B is a vertical sectional view taken along A-A in FIG. 4A.
Figure 4C:
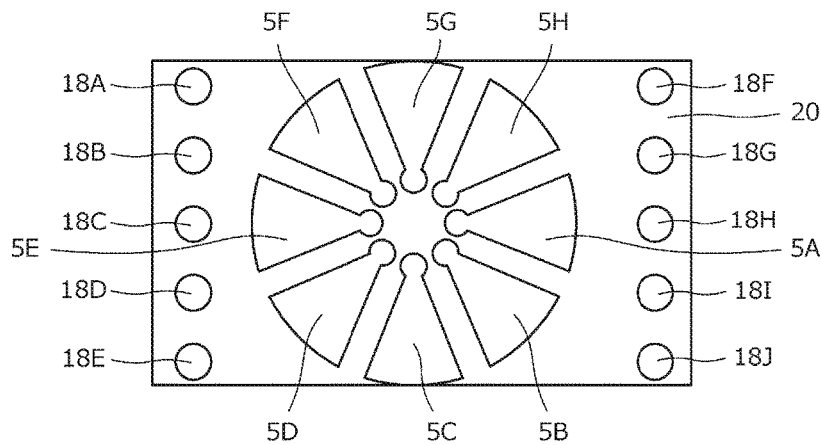
FIG. 4C is bottom view of the power supply module 102.
Figure 5A:
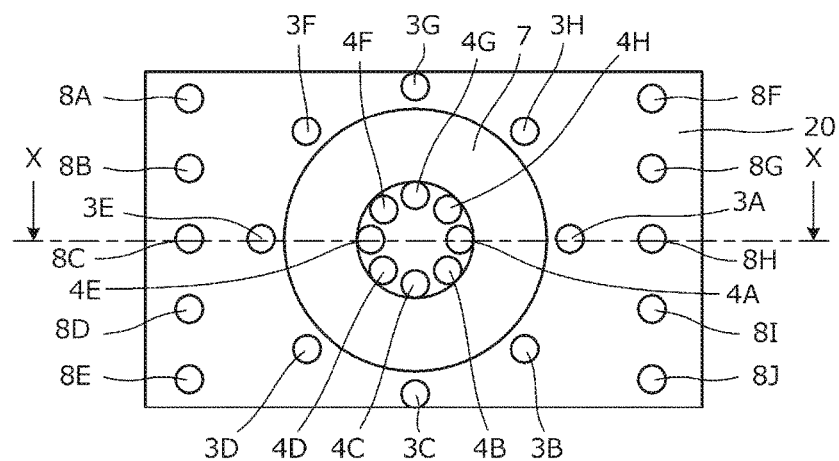
FIG. 5A is a horizontal sectional view taken along B-B in FIG. 4B
Figure 5B:
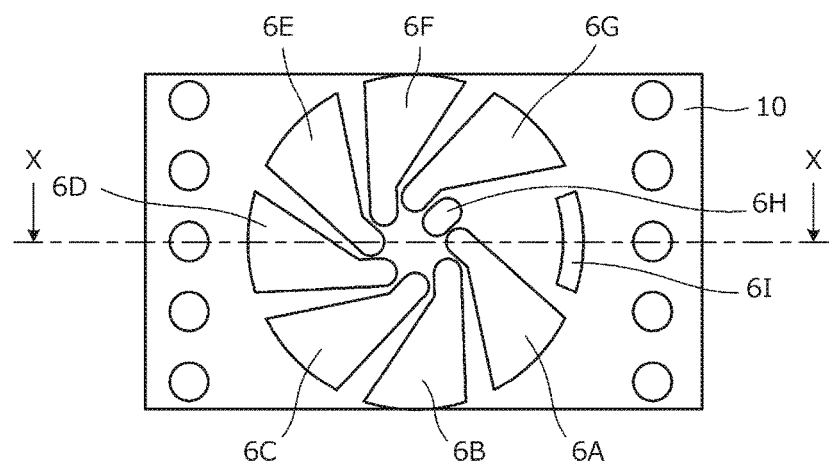
FIG. 5B is bottom view of a substrate 10 of the power supply module 102.

FIG. 4A is a plan view of a power supply module 102 according to a second preferred embodiment of the present invention, FIG. 4B is a vertical sectional view taken along A-A in FIG. 4A, and FIG. 4C is bottom view of the power supply module 102. In addition, FIG. 5A is a horizontal sectional view taken along B-B in FIG. 4B and FIG. 5B is bottom view of a substrate 10 of the power supply module 102. In addition, FIG. 4B is a vertical sectional view taken along X-X in FIGS. 5A and 5B.

The power supply module 102 of this preferred embodiment includes the substrate 10. The substrate 10 is a resin multilayer substrate, and prescribed wiring patterns are provided on a first main surface (lower surface in orientation illustrated in FIG. 4) and a second main surface (upper surface in orientation illustrated in FIG. 4) of the substrate 10, and inside the substrate 10. A switching control IC 11 and chip components 12A, 12B, 14A, 14B, 15 and 16 are mounted on the second main surface of the substrate 10.

A plurality of metal posts 3A to 3H, 4A to 4H and 8A to 8J, which each include a first end and a second end, are provided on the first main surface of the substrate 10.

As illustrated in FIGS. 5A and 5B, wiring conductors 6A to 6G, which connect first ends of the metal posts 3A to 3H and 4A to 4H to each other, and wiring conductors 6H and 6I, which define input terminals of the coil, are provided on the first main surface of the substrate 10. In addition, as illustrated in FIG. 4C, the second ends of the metal posts 3A to 3H and 4A to 4H are connected to each other by post connection conductors 5A to 5H.

In contrast to the first preferred embodiment, in this preferred embodiment, only one coil is defined by the metal posts 3A to 3H and 4A to 4H, the wiring conductors 6A to 6G, 6H and 6I, and the post connection conductors 5A to 5H. The power supply module 102 includes a magnetic core 7 that includes a toroidal magnetic ferrite. The coil defined of the metal posts 3A to 3H and 4A to 4H, the wiring conductors 6A to 6G, 6H and 6I and the post connection conductors 5A to 5H is wound around the magnetic core 7.

Sealing resin 20 is provided on the first main surface of the substrate 10. The sealing resin 20 seals the metal posts 3A to 3H, 4A to 4H and 8A to 8J and the magnetic core 7. In contrast to first preferred embodiment, the post connection conductors 5A to 5H are exposed from the surface of the sealing resin 20 (lower surface in orientation illustrated in of FIG. 4B).

Solder bumps 18A to 18J are provided on the second ends of the metal posts 8A to 8J. The solder bumps 18A to 18J are exposed through the lower surface of the sealing resin 20.

The post connection conductors 5A to 5H are formed using the following non-limiting example of a method.

(1) The sealing resin 20 is applied with such a thickness as to cover the second ends of the metal posts 3A to 3H, 4A to 4H and 8A to 8J and then cured.

(2) The surface of the sealing resin 20 is ground down until the second ends of the metal posts 3A to 3H, 4A to 4H and 8A to 8J are exposed.

(3) Conductive paste patterns, which are for forming the post connection conductors 5A to 5H, are formed by printing on the surface of the sealing resin 20 and allowed to harden.

(4) The post connection conductors 5A to 5H, which are made of conductive paste, are subjected to Cu plating and the film thickness thereof is increased.

(5) Solder bumps are adhered to the second ends of the metal posts 8A to 8J.

The coil defines a current path as a result of the constituent portions thereof being connected together in the following order.

Conductor 6I (refer to FIG. 5B)→metal post 3A (refer to FIG. 5A)→conductor 5A (refer to FIG. 4C)→metal post 4A→conductor 6A→metal post 3B→conductor 5B→metal post 4B→conductor 6B→metal post 3C→conductor 5C→metal post 4C→conductor 6C→metal post 3D→conductor 5D→metal post 4D→conductor 6D→metal post 3E→conductor 5E→metal post 4E→conductor 6E→metal post 3F→conductor 5F→metal post 4F→conductor 6F→metal post 3G→conductor 5G→metal post 4G→conductor 6G→metal post 3H→conductor 5H→metal post 4H→conductor 6H.

Figure 6A:
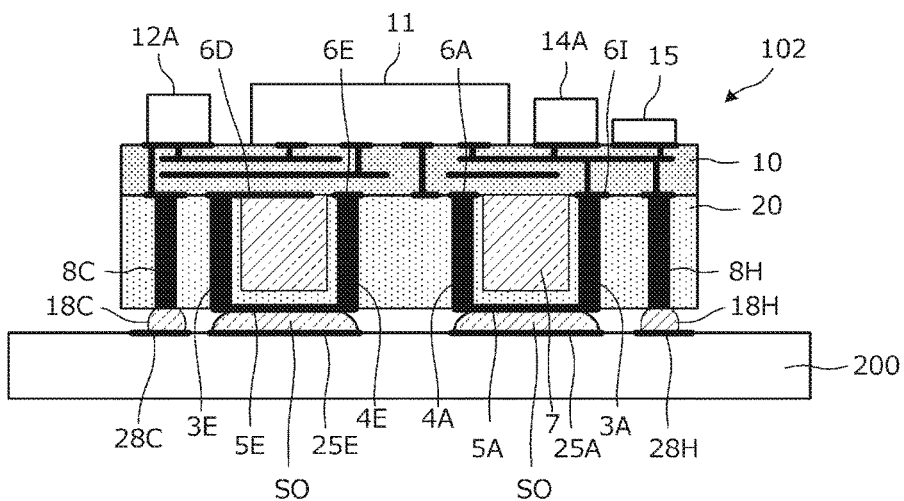
FIG. 6A is a sectional view illustrating a mounting structure for the power supply module 102 according to the second preferred embodiment of the present invention, the mounting structure being for mounting the power supply module 102 on a printed wiring board 200.
Figure 6B:
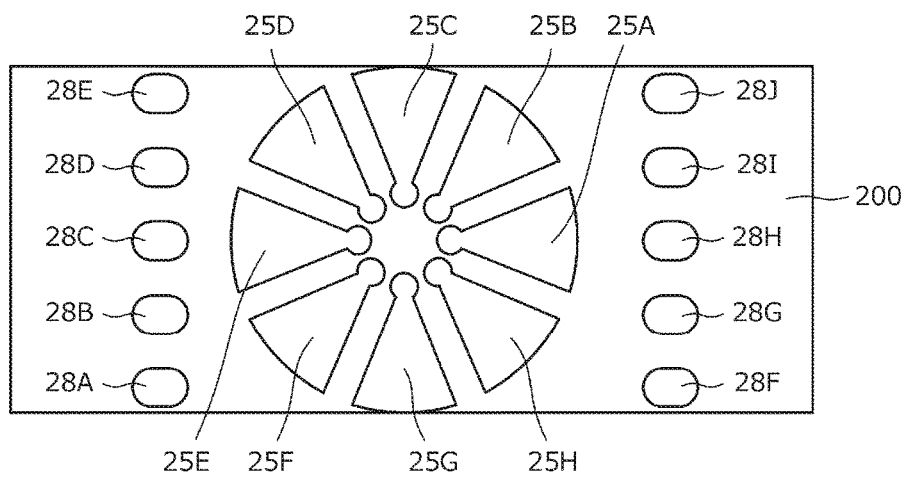
FIG. 6B is a plan view of mounting portions of the printed wiring board 200 on which the power supply module 102 is mounted.

FIG. 6A is a sectional view illustrating a mounting structure for the power supply module 102 of this preferred embodiment, the mounting structure being structured to mount the power supply module 102 on a printed wiring board 200. FIG. 6B is a plan view of mounting portions of the printed wiring board 200 on which the power supply module 102 is to be mounted. Surface conductors (printed-wiring-board-side mounting electrodes) 25A to 25H are provided on the printed wiring board 200. The surface conductors 25A to 25H are connected to the post connection conductors 5A to 5H that are exposed at the lower surface of the power supply module 102. In addition, mounting electrodes 28A to 28H, which are connected to the solder bumps 18A to 18J, are provided on the printed wiring board 200.

As illustrated in FIG. 6A, the post connection conductors 5A to 5H are connected to the surface conductors 25A to 25H via solder layers SO. The surface conductors 25A to 25H preferably have the same or substantially the same patterns as the post connection conductors 5A to 5H. Thus, the surface conductors 25A to 25H define a portion of the coil. The surface conductors 25A to 25H do not necessarily need to have the same or substantially the same patterns as the post connection conductors 5A to 5H. Provided that there are portions that are electrically connected in parallel with the post connection conductors, an effect of the direct-current resistance of the coil being reduced in accordance with the surface areas of the parallel connected portions is provided.

Figure 7:
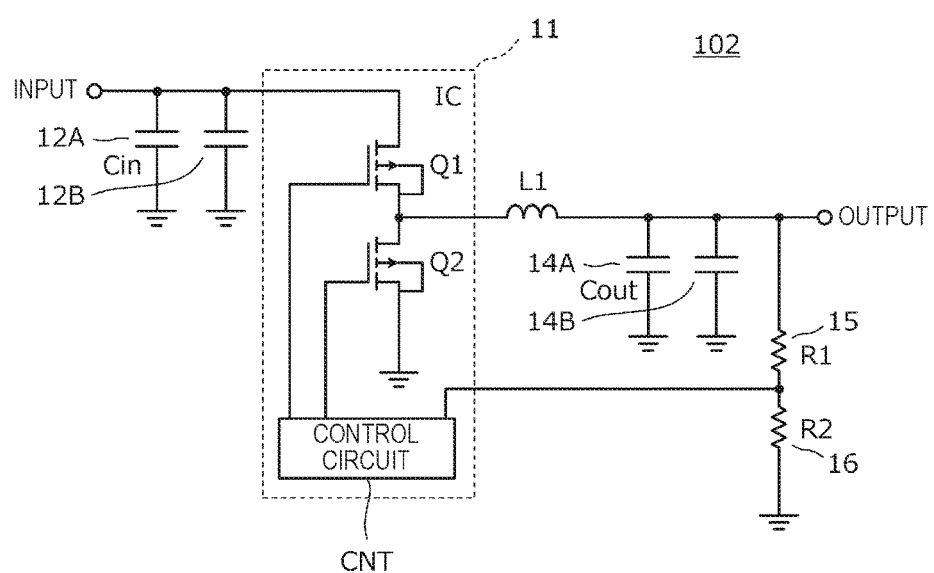
FIG. 7 is a circuit diagram of the power supply module 102 according to the second preferred embodiment of the present invention.

FIG. 7 is a circuit diagram of the power supply module 102 of this preferred embodiment. The power supply module 102 is preferably a step-down-converter-type DC/DC converter, for example. The switching control IC 11 includes switching elements Q1 and Q2 and a switching control circuit CNT. A series circuit including the switching element Q1 and a coil L1 (the coil L1 is defined by the metal posts 3A to 3H and 4A to 4H, the wiring conductors 6A to 6G, 6H and 6I and the post connection conductors 5A to 5H) is connected between the input terminal and the output terminal. In addition, the switching element Q2 is connected between an input terminal of the coil L1 and the ground. Input capacitors Cin (chip components 12A and 12B) are connected between the input terminal and the ground. Output capacitors Cout (chip components 14A and 14B) are connected between the output terminal and the ground. The switching control circuit CNT is connected to the gates of the switching elements Q1 and Q2. A voltage-dividing circuit, which includes of resistors R1 and R2 (chip components 15 and 16), is connected to the output terminal, and a divided voltage produced thus is fed back to the control circuit CNT. The switching control circuit CNT controls an on duty of the switching elements Q1 and Q2 such that the output voltage is constant.

The power supply module of this preferred embodiment is used as a non-insulation-type stabilization power supply having a current capacity of around several amps to several tens of amps, for example.

According to this preferred embodiment, the surface conductors 25A to 25H of the printed wiring board 200 define a portion of the coil conductor, and therefore, the direct-current resistance of the coil is further reduced. In addition, since the surface conductors 25A to 25H of the printed wiring board and the printed wiring board 200 define and function as heat-radiating members for the coil, the power supply module 102 is further reduced in size. In addition, since the surface areas of bonds to the surface conductors of the printed wiring board 200 are able to be made large, stress acting on terminals arranged along the periphery of the substrate 10 (solder bumps 18A to 18J) is reduced or relaxed. Therefore, sufficient connection reliability is ensured.

The width of post connection conductors and wiring conductors cannot be made large in the center of a toroidal coil and the current density is high in this portion of the toroidal coil. However, as in this preferred embodiment, since the surface conductors of the printed wiring board 200 define a portion of the coil in this preferred embodiment, the concentration of current density is reduced. In addition, in relation to this, surface conductors of the printed wiring board 200 may be disposed only at positions that are close to the center of the toroidal coil.

Furthermore, as in the power supply module 102 of the second preferred embodiment, a configuration may also be adopted for the power supply module 101 of the first preferred embodiment in which the post connection conductors 5A to 5H are exposed at the lower surface.

Third Preferred Embodiment

Figure 8:
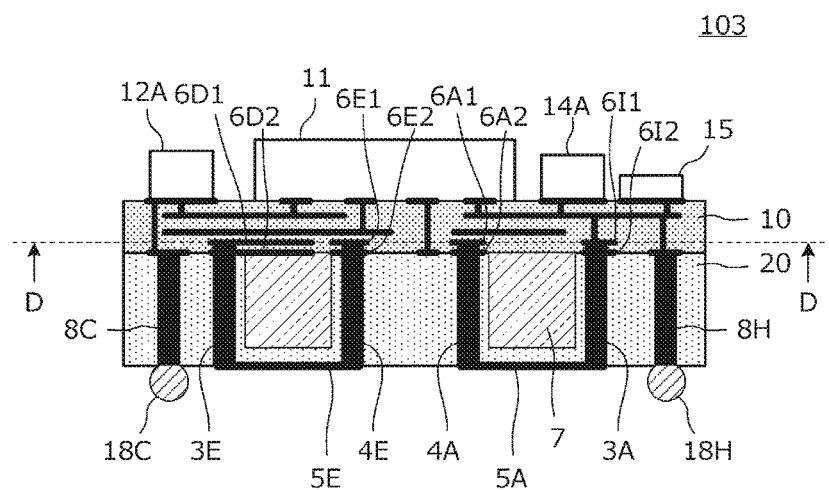
FIG. 8 is a sectional view of a main portion of a power supply module 103 according to a third preferred embodiment of the present invention.
Figure 9A:
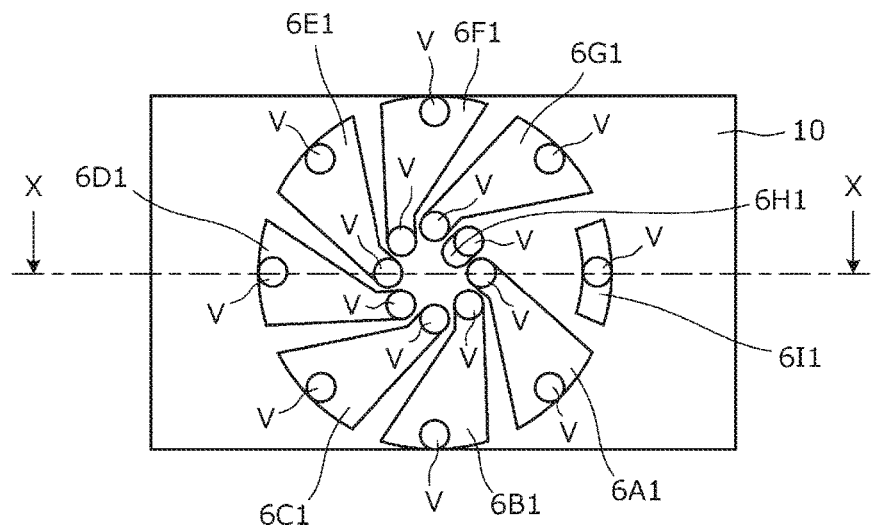
FIG. 9A is a horizontal sectional view taken along D-D in FIG. 8.
Figure 9B:
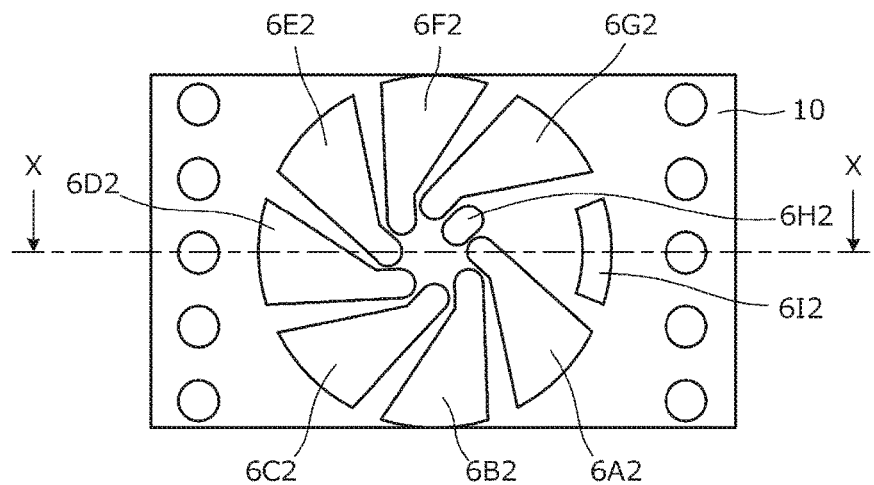
FIG. 9B is a bottom view of a substrate 10 of the power supply module 103.

FIG. 8 is a sectional view of a main portion of a power supply module 103 according to a third preferred embodiment of the present invention. FIG. 9A is a horizontal sectional view taken along D-D in FIG. 8. FIG. 9B is a bottom view of a substrate 10 of the power supply module 103.

The power supply module 103 of this preferred embodiment includes the substrate 10. The substrate 10 is a resin multilayer substrate, and prescribed wiring patterns are provided on a first main surface (lower surface in orientation illustrated in FIG. 8) and a second main surface (upper surface in orientation illustrated in FIG. 8) of the substrate 10, and inside the substrate 10. A switching control IC 11 and chip components 12A, 14A, 15 and other suitable components are mounted on the second main surface of the substrate 10.

A plurality of metal posts 3A, 3E, 4A, 4E, 8C, 8H, which each include a first end and a second end, are arranged on the first main surface of the substrate 10.

In contrast to the second preferred embodiment, at least some of the wiring conductors provided on the substrate 10 are defined by conductor patterns provided on a plurality of insulating layers. The rest of the configuration is the same or substantially the same as that of the second preferred embodiment.

FIG. 9A illustrates wiring conductor patterns 6A1, 6B1, 6C1, 6D1, 6E1, 6F1, 6G1, 6H1 and 6I1 of a first layer provided in the substrate 10. FIG. 9B illustrates wiring conductor patterns 6A2, 6B2, 6C2, 6D2, 6E2, 6F2, 6G2, 6H2 and 6I2 of a second layer (lower surface of substrate 10) provided in the substrate 10.

The first layer wiring conductor patterns 6A1 to 6I1 and the second layer wiring conductor patterns 6A2 to 6I2 are electrically connected to each other by via conductors V.

Thus, the effective cross sectional areas of the wiring conductors are able to be increased by arranging the wiring conductors provided in the substrate 10 over a plurality of layers.

Incidentally, although increasing the thickness of a conductor pattern provided in a resin multilayer substrate is an effective way of reducing the resistance value of the conductor pattern, there is a limit to how much the thickness of a conductor pattern provided in a resin multilayer substrate can be increased. This is because it is impossible to achieve narrow pitch wiring when the thickness of a conductor pattern is made large and there is a risk of the reliability being degraded, such as the occurrence of resin voids or short circuits between wiring lines. The wiring resistance is able to be reduced without degrading reliability by also providing wiring conductors inside the resin multilayer substrate rather than just on the surface of the resin multilayer substrate and connecting the coil wiring lines in parallel with each other.

According to this preferred embodiment, the resistance values of the conductor patterns of the substrate 10 are reduced and the direct-current resistance of the coil is further reduced.

Fourth Preferred Embodiment

A fourth preferred embodiment of the present invention is directed to the shapes of a coil and a magnetic core of a power supply module. The coils and the magnetic cores of the power supply modules of this preferred embodiment preferably have different shapes from those described in the preceding preferred embodiments. FIGS. 10A-10C, FIGS. 11A and 11B, and FIGS. 12A and 12B illustrate three types of a coil and a magnetic core of the fourth preferred embodiment. In each case, only the magnetic core and the portion of the coil wound around the magnetic core are illustrated. The configurations of the substrate and the sealing resin are the same or substantially the same as described in the preceding preferred embodiments.

Figure 10A:
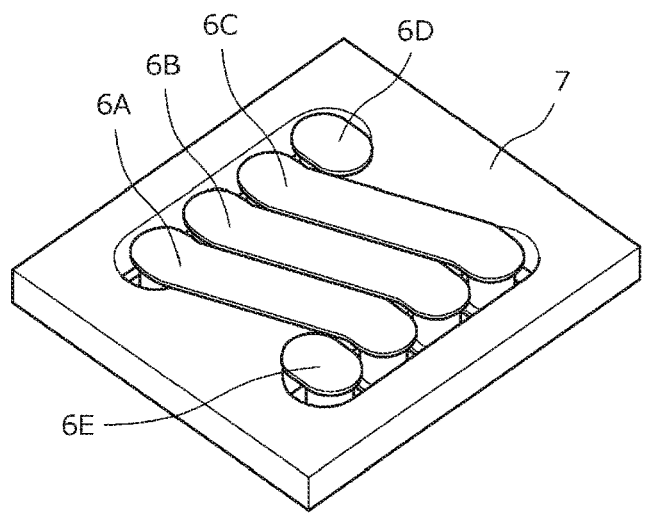
FIG. 10A is a perspective view seen from above a magnetic core 7 around which a coil is wound.
Figure 10B:
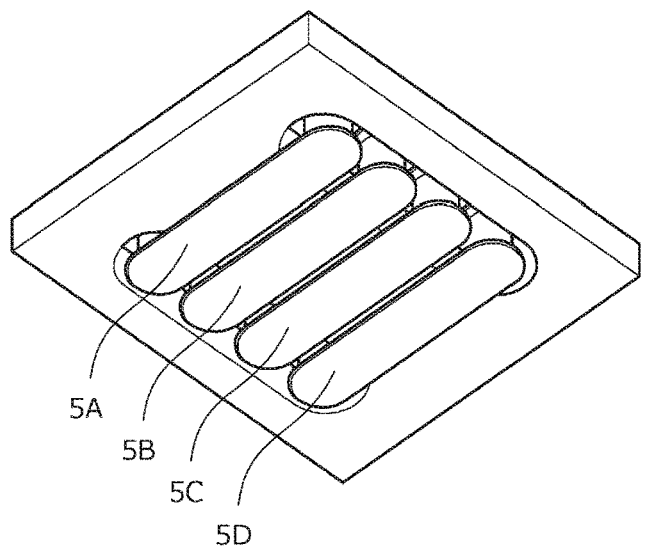
FIG. 10B is a perspective view seen from below the magnetic core 7.
Figure 10C:
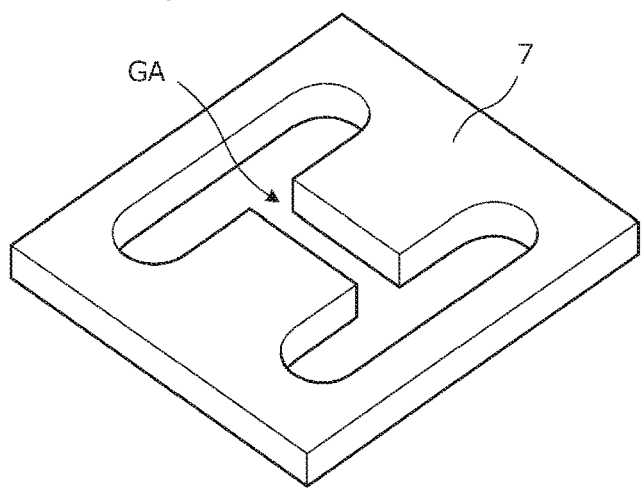
FIG. 10C is a perspective view of the magnetic core 7.

FIG. 10A is a perspective view seen from above a magnetic core 7 around which a coil is wound, and FIG. 10B is a perspective view seen from below the magnetic core 7. In addition, FIG. 10C is a perspective view of the magnetic core 7. One coil is formed by wiring conductors 6A to 6E, post connection conductors 5A to 5D, and metal posts that connect the wiring conductors 6A to 6E and the post connection conductors 5A to 5D to each other.

As illustrated in FIG. 10C, the magnetic core 7 includes a magnetic path gap GA provided in a central arm of a spectacles-shaped or H-shaped ferrite core.

With this structure, a coil device (inductor) is provided that includes a magnetic core having a gap-equipped closed-magnetic circuit structure. Since magnetic saturation is reduced or prevented by the magnetic circuit gap, magnetic saturation is avoided while using a magnetic material that can be used in a band of several MHz and that has excellent high-frequency characteristics, such as a sintered ferrite, for example.

Figure 11A:
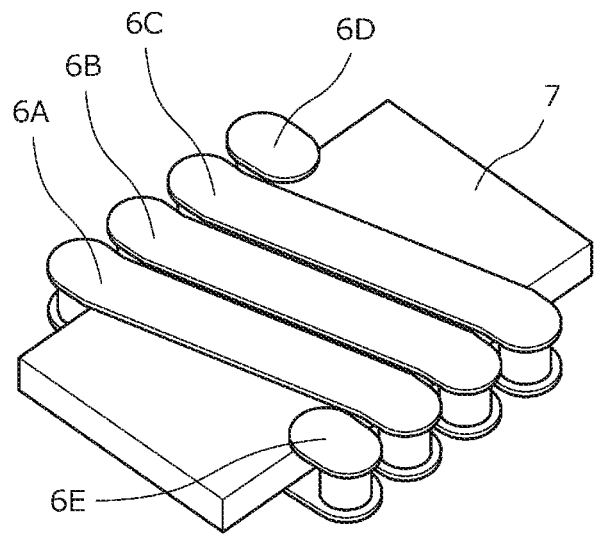
FIG. 11A is a perspective view seen from above a magnetic core 7 around which a coil is wound.
Figure 11B:
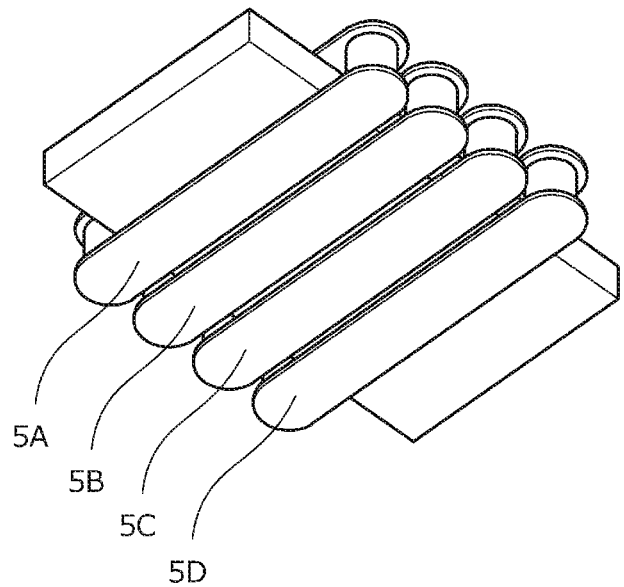
FIG. 11B is a perspective view seen from below the magnetic core 7.

FIG. 11A is a perspective view seen from above a magnetic core 7 around which a coil is wound, and FIG. 11B is a perspective view seen from below the magnetic core 7. One coil is defined by wiring conductors 6A to 6E, post connection conductors 5A to 5D, and metal posts that connect the wiring conductors 6A to 6E and the post connection conductors 5A to 5D to each other. In this example, the magnetic core 7 is preferably a ferrite core having a rectangular or substantially rectangular parallelepiped plate shape, for example.

Figure 12A:
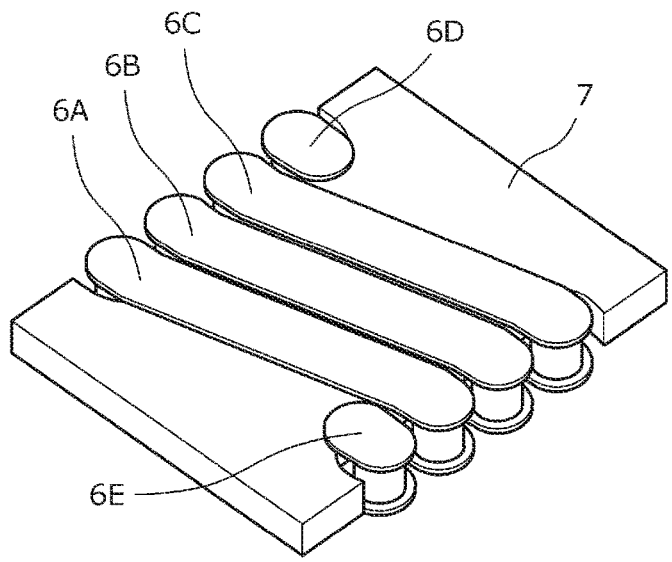
FIG. 12A is a perspective view seen from above a magnetic core 7 around which a coil is wound.
Figure 12B:
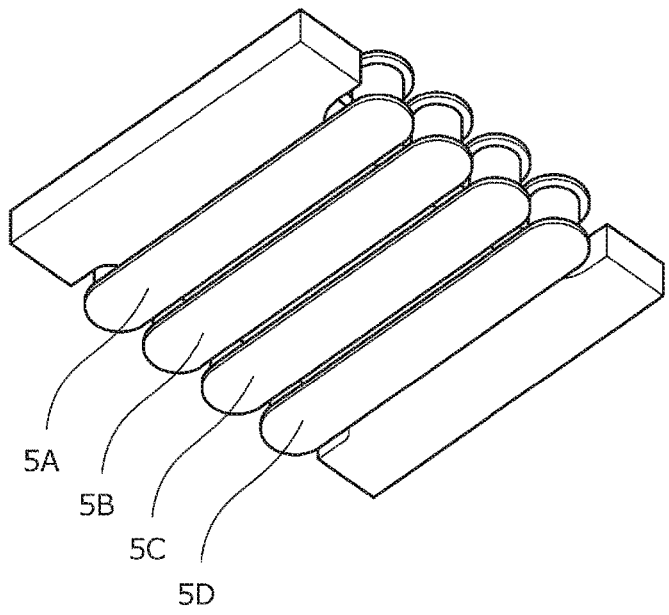
FIG. 12B is a perspective view seen from below the magnetic core 7.

FIG. 12A is a perspective view seen from above a magnetic core 7 around which a coil is wound, and FIG. 12B is a perspective view seen from below the magnetic core 7. One coil is defined by wiring conductors 6A to 6E, post connection conductors 5A to 5D, and metal posts that connect the wiring conductors 6A to 6E and the post connection conductors 5A to 5D to each other. In this example, the magnetic core 7 is preferably a plate-shaped ferrite core having the shape of the letter I (dog bone shape), for example.

In both of the structures illustrated in FIGS. 11A and 11B and in FIGS. 12A and 12B, a coil device is provided that includes a magnetic core having an open magnetic circuit structure. In addition, in both of the structures illustrated in FIGS. 11A and 11B and in FIGS. 12A and 12B, a magnetic circuit gap may be provided inside the magnetic core 7.

Fifth Preferred Embodiment

A fifth preferred embodiment of the present invention is directed to the shapes of a coil and a magnetic core of a power supply module. The coil of the power supply module of this preferred embodiment has a different shape from those described in the preceding preferred embodiments.

Figure 13:
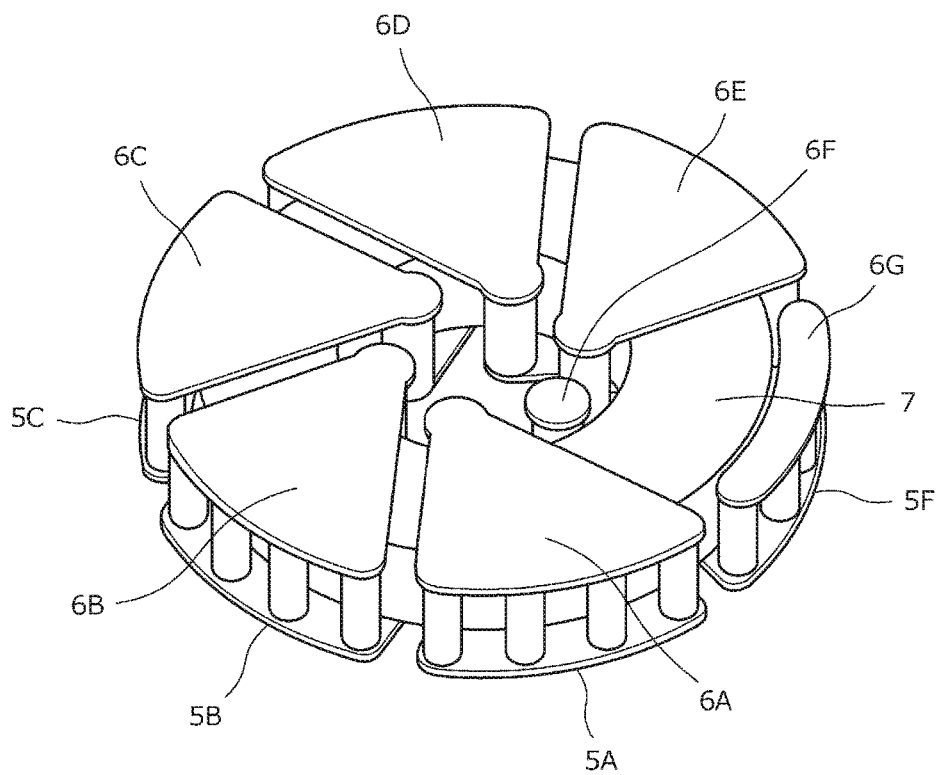
FIG. 13 is a perspective view of a coil device according to a fifth preferred embodiment of the present invention, the coil device including a coil and a magnetic core.
Figure 14:
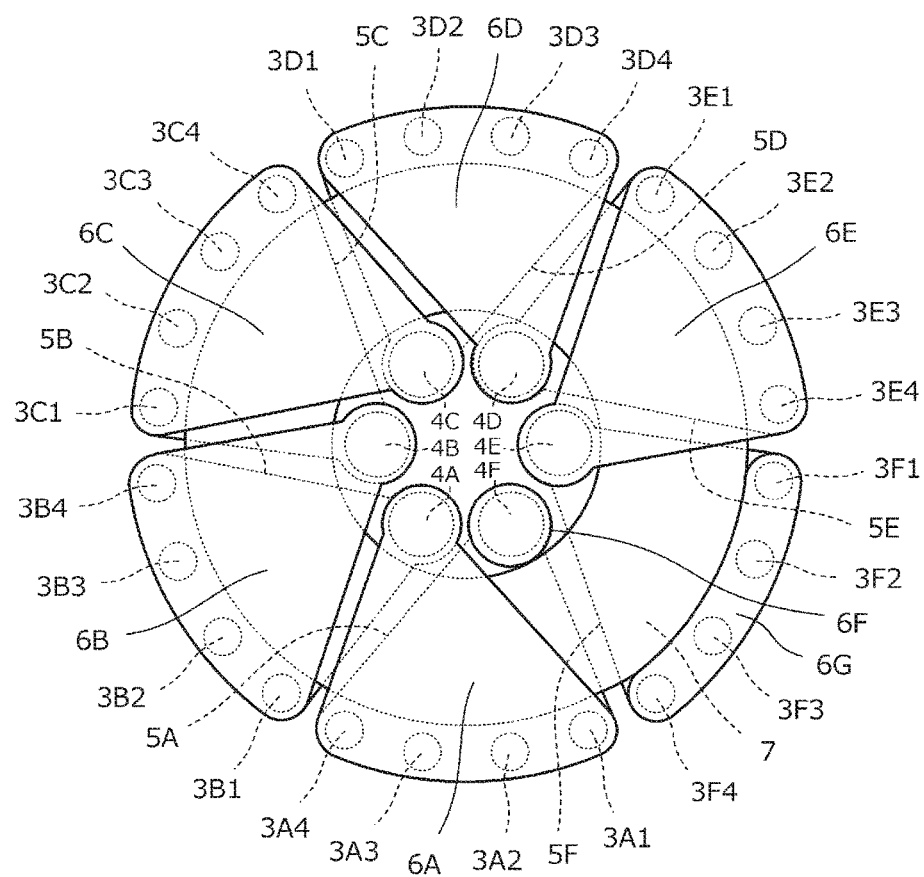
FIG. 14 is a plan view of the coil device according to the fifth preferred embodiment of the present invention.

FIG. 13 is a perspective view of a coil device according to the fifth preferred embodiment, the coil device including a coil and a magnetic core. FIG. 14 is a plan view of the coil device.

In the coil device according to this preferred embodiment, one coil is defined by wiring conductors 6A to 6G, post connection conductors 5A to 5F, and metal posts 4A to 4F, 3A1 to 3A4, 3B1 to 3B4, 3C1 to 3C4, 3D1 to 3D4, 3E1 to 3E4, and 3F1 to 3F4 that connect the wiring conductors 6A to 6G and the post connection conductors 5A to 5F to each other.

The wiring conductors 6A to 6G are provided on the substrate. The post connection conductors 5A to 5F are provided inside or on a surface of a sealing resin. The configurations of the substrate and the sealing resin are preferably the same or substantially the same as described in the preceding preferred embodiments. The wiring conductors 6F and 6G are connected to a circuit provided on the substrate.

Among the plurality of metal posts, the number of metal posts 3A1 to 3A4, 3B1 to 3B4, 3C1 to 3C4, 3D1 to 3D4, 3E1 to 3E4, and 3F1 to 3F4 that are located outside the magnetic core 7 is larger than the number of metal posts 4A to 4F that are located inside the magnetic core 7. With this structure, the resistance value of the portion of the coil defined by the plurality of metal post 3A1 to 3A4, 3B1 to 3B4, 3C1 to 3C4, 3D1 to 3D4, 3E1 to 3E4, and 3F1 to 3F4 that are located on the outside is reduced, and a coil having a smaller direct-current resistance is provided.

Furthermore, the diameters of the metal posts 3A1 to 3A4, 3B1 to 3B4, 3C1 to 3C4, 3D1 to 3D4, 3E1 to 3E4, and 3F1 to 3F4 that are located outside the magnetic core 7 are smaller than the diameters of the metal posts 4A to 4F that are located inside the magnetic core 7. For example, the diameters of the metal posts 4A to 4F located inside the magnetic core 7 are preferably about 0.8 mm, and the diameters of the metal posts 3A1 to 3A4, 3B1 to 3B4, 3C1 to 3C4, 3D1 to 3D4, 3E1 to 3E4, and 3F1 to 3F4 that are located outside the magnetic core 7 are preferably about 0.5 mm. A reduction in the surface area of the coil is achieved with this structure.

In addition, the planar shapes of the post connection conductors 5A to 5F and the planar shapes of the wiring conductors 6A to 6E are preferably in laterally symmetrical relationships with each other. That is, paths from metal posts located outside the magnetic core to two adjacent metal posts located inside the magnetic core are the shortest distances along both the post connection conductors and the wiring conductors. For example, path lengths along the post connection conductor 5A and path lengths along the wiring conductor 6A, which are respectively connected to the metal posts 4A and 4F, from the metal posts 3A1 to 3A4 are the shortest distances. The direct-current resistance of the coil is further reduced through this arrangement of the post connection conductors, the wiring conductors and the metal posts.

Finally, the descriptions of the above preferred embodiments are illustrative in all points and should not be thought of as being restrictive. Modifications and changes can be appropriately made by one skilled in the art. For example, portions of the configurations described in different preferred embodiments can be substituted for one another or combined with each other. The scope of the present invention will be defined by the claims rather than by the above-described preferred embodiments. In addition, it is intended that equivalents to the scope of the claims and all modifications that are within the scope of the claims be included within the scope of the present invention.

Other than a magnetic ferrite, a molded article made of a dust-based or metal-composite-based magnetic material may be used as the magnetic core. Since a micro-gap exists from scratch in the case of a dust-based or metal-composite-based magnetic core, magnetic saturation is not a significant problem.

In addition, a conductive bonding material other than a Sn-based solder can be used in electromechanical bonding portions in the above-described preferred embodiments. For example, a conductive bonding material, in the form of a paste, may preferably be used that includes a low-melting point metal powder (Sn) and an alloy powder (Cu—Ni alloy or Cu—Mn alloy) that can form an inter-metallic compound with the low-melting-point metal powder at a temperature equal to or higher than the melting temperature of the low-melting point metal powder. This conductive bonding material hardens by being heated without passing through a melted state. When this conductive bonding material is used, a transformation to an inter-metallic compound having a high melting point of at least about 400° C., for example, is produced and a low-melting point compound is removed by performing heating at about 300° C., for example. Consequently, for example, since bonding portions formed of the conductive bonding material have excellent strength at high temperatures, high-reliability mounting is possible without the occurrence of re-melting in a reflow solder process where a power supply module is mounted on a printed wiring board using a reflow solder method.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power supply module comprising:
   a substrate;
   a switching control IC; and
   a coil; wherein
   the coil includes:
      a plurality of metal posts that each include a first end and a second end, the first ends being provided on a first surface of the substrate;
      a wiring conductor that is provided on the substrate and that is in conductive contact with the first ends of the metal posts; and
      a post connection conductor that is in conductive contact with the second ends of the metal posts;
   the power supply module further comprising:
      a magnetic core that strengthens magnetic flux generated by the coil;
      a sealing resin that is provided on a first main surface of the substrate and seals the metal posts and the magnetic core; and
      an external-connection metal post that is located in the sealing resin and outside the coil and includes a first end and a second end, the first end being provided on the first surface of the substrate, and the second end being exposed from the sealing resin; and
   the metal posts and the external-connection metal post are metal pins.

2. The power supply module according to claim 1, wherein the coil includes a primary coil and a secondary coil that is electrically insulated from the primary coil, and an insulating portion between the primary coil and the secondary coil is sealed with the sealing resin.

3. The power supply module according to claim 1, wherein the post connection conductor is located inside the sealing resin.

4. The power supply module according to claim 1, wherein at least a portion of the post connection conductor is exposed from the sealing resin.

5. The power supply module according to claim 4, wherein the post connection conductor, which is exposed from the sealing resin, defines a mounting electrode that is to be mounted on a printed wiring substrate, which is a mounting target.

6. The power supply module according to claim 1, wherein the coil and the magnetic core define a toroidal coil.

7. The power supply module according to claim 6, wherein
   the plurality of metal posts are provided outside and inside the magnetic core; and
   among the plurality of metal posts, a larger number of metal posts is located outside the magnetic core than inside the magnetic core.

8. The power supply module according to claim 7, wherein diameters of the metal posts located outside the magnetic core are smaller than diameters of the metal posts located inside the magnetic core.

9. The power supply module according to claim 8, wherein the diameters of the metal posts located outside the magnetic core are about 0.5 mm and the diameters of the metal posts located inside the magnetic core are about 0.8 mm.

10. The power supply module according to claim 1, wherein a magnetic circuit gap is provided in a portion of the magnetic core.

11. The power supply module according to claim 1, wherein the substrate includes a ground conductor disposed between the switching control IC and the coil.

12. The power supply module according to claim 1, wherein a diameter of the plurality of metal posts about 0.5 mm to about 1.0 mm and a length of the plurality of metal posts is about 1.5 mm to about 3.0 mm.

13. The power supply module according to claim 1, wherein the sealing resin is an epoxy resin.

14. The power supply module according to claim 1, wherein
   the substrate is a multilayer body including a plurality of insulating layers that each include a conductor pattern; and
   the wiring conductor is defined by conductor patterns provided on the plurality of insulating layers.

15. The power supply module according to claim 1, wherein the magnetic core has a rectangular or substantially rectangular parallelepiped plate shape.

16. The power supply module according to claim 1, wherein the magnetic core has one of an H-shape and an I-shape.

17. A mounting structure to mount a power supply module on a printed wiring board, the power supply module including a substrate, a switching control IC and a coil, the coil including a plurality of metal posts that each include a first end and a second end, the first ends being provided on a first surface of the substrate, a wiring conductor that is provided on the substrate and that is in conductive contact with the first ends of the metal posts, and a post connection conductor that is in conductive contact with the second ends of the metal posts, the power supply module further including a magnetic core that strengthens magnetic flux generated by the coil, and a sealing resin that is provided on a first main surface of the substrate and seals the metal posts and the magnetic core, and an external-connection metal post that is located in the sealing resin and outside the coil and includes a first end and a second end, the first end being provided on the first surface of the substrate, and the second end being exposed from the sealing resin; wherein a surface conductor that corresponds to the external-connection metal post is provided on the printed wiring board;

the external-connection metal post and the surface conductor on the printed wiring board are connected to each other by a conductive bonding material; and the metal posts and the external-connection metal post are metal pins.

18. The mounting structure according to claim 17, wherein at least a portion of the post connection conductor is exposed from the sealing resin;

a surface conductor that corresponds to the post connection conductor, which is exposed from the sealing resin, is provided on the printed wiring board; and the post connection conductor, which is exposed from the sealing resin, and the surface conductor on the printed wiring board are connected to each other by a conductive bonding material.

\* \* \* \* \*